United States Patent Office 3,287,147
Patented Nov. 22, 1966

3,287,147
PROCESS FOR MANUFACTURE OF QUINACRIDONE PIGMENT COMPOSITIONS
Donald Graham Wilkinson, Manchester, England, assignor to Imperial Chemical Industries Limited, Millbank, London, England, a corporation of Great Britain
No Drawing. Filed June 24, 1963, Ser. No. 290,216
Claims priority, application Great Britain, July 5, 1962, 25,903/62
2 Claims. (Cl. 106—288)

This invention relates to an improved process for the manufacture of pigment compositions of the quinacridone series and this application is a continuation-in-part of copending application Serial No. 20,524, filed April 7, 1960.

In British Patent No. 896,916 (corresponding to Serial No. 20,524) there are described and claimed new pigment compositions comprising at least 2 linear quinacridones of the formula

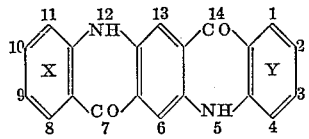

wherein the rings X and Y may be substituted by halogen atoms, methyl groups or alkoxy groups of not more than 5 carbon atoms, or may carry fused benz rings, said compositions being characterised in that the X-ray diffraction patterns thereof are different from the sum of the diffraction patterns of their constituent quinacridones. British Patent No. 896,916 also describes and claims a process for the manufacture of new pigment compositions which comprises treating a finely divided mixture of 2 or more linear quinacridones of the formula

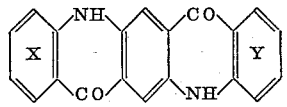

wherein X and Y have the meanings previously stated, with an organic liquid of dielectric constant greater than 9.

British Patent 955,854 describes and claims a process for manufacture of the new pigment compositions of British Patent No. 896,916 which comprises heating with an organic solvent an aqueous paste containing two or more finely divided linear quinacridones of the formula

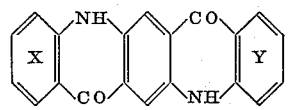

wherein the rings X and Y may be substituted by halogen atoms, methyl groups or alkoxy groups of not more than 5 carbon atoms.

According to the present invention, which is a further improvement in or modification of British No. 896.916 there is provided a process for manufacture of the new pigment compositions of British Patent No. 896,916 which comprises heating under pressure at between 150° and 300° a neutral aqueous paste containing two or more finely divided linear quinacridones of the formula

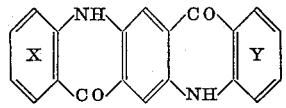

wherein the rings X and Y may be substituted by halogen atoms, methyl groups or alkoxy groups of not more than 5 carbon atoms. These quinacridones may also be illustrated by the formula

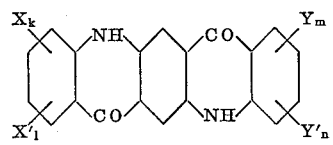

wherein X, X', Y and Y' are radicals selected from the group consisting of Cl, Br, an alkyl group having 1–4 carbon atoms and an alkoxy group having 1–4 carbon atoms, and where $k$, $l$, $m$ and $n$ are integers from 0–1.

The term "neutral" indicates a pH of approximately 7, for example between the limits of about 6 and 8.

Aqueous pastes containing two or more finely divided linear quinacridones and suitable for use in the process of the invention may be obtained by mixing two or more aqueous pastes of finely divided quinacridones, or by mixing the dried quinacridones, for example in crystalline form and subjecting the mixture to a known procedure for obtaining finely divided solids in paste form. For example a mixture of dry, crystalline quinacridones may be dissolved in sulphuric or polyphosphoric acid, the solution mixed with water and the precipitated finely divided mixture of quinacridones may be filtered off and washed free of acid with water. Alternatively a mixture of dry crystalline quinacridones may be salt milled and the salt removed by washing with water.

If desired, a mixture of 2 or more quinacridones may be obtained synthetically by (a) dehydrogenating a mixture of 2 or more dialkyl 2:5-bis (arylamino)-3:6-dihydroterephthalates, optionally hydrolysing the dialkyl ester groups and cyclising the product by heating with a dehydrating or condensing agent or, (b) cyclising a mixture of 2 or more 2:5-bis-(arylamino)-3:6-dihydroterephthalic acids or dialkyl esters by heating with a dehydrating or condensing agent and dehydrogenating the product.

Aqueous pastes suitable for use in the process of the invention may sometimes be obtained directly by carrying out one of the syntheses (a) or (b). For example the final stage of synthesis (a) may be carried out in sulphuric or polyphosphoric acid, the quinacridones may be precipitated by mixing with water, and an aqueous paste obtained by filtration and washing of the precipitate.

The process of the invention is carried out in an autoclave, preferably with stirring. Prolonged heating is usually necessary in order to complete the process, the duration depending largely upon the temperature of operation. The preferred operating temperature is 220° to 270° when satisfactory production of the pigment compositions takes place by heating for about 12 to 36 hours.

After carrying out the process of the invention the slurry of the pigment composition may, if desired, be acidified and heated to remove traces of iron picked up from the autoclave, and the product may be filtered, washed and dried. The dried products are suitable for use as pigments, no grinding or milling being necessary.

The pigment compositions obtained by the process of the invention, like the compositions obtained by the process of British Patent No. 896,916, give shades which are brighter than those obtainable by the separate use of individual constituent quinacridones. As with the pigment compositions of British Patent No. 896,916 the increased brightness appears to be connected with a change in crystallographic form since the X-ray diffraction patterns of the pigment compositions obtained by the process of this invention are sharply defined compared with those of the mixtures used as starting material and are different from the sum of those of the separate constituent quinacridones. It is thought probable that the compositions obtained by the process of this invention are "mixed crystals" of the quinacridones.

The process of this invention has advantages over the process described and claimed in British Patent No. 896,916 because it can be applied directly to aqueous pastes such as may be obtained directly from reaction mixtures, there being no necessity for intermediate drying and/or milling operations, and no usage of organic solvent.

The invention is illustrated but not limited by the following examples in which the parts are by weight.

*Example 1*

A mixture of 1.82 parts of 4:11-dichloro-lin-quinacridone and 3.17 parts of lin-quinacridone is dissolved in 90 parts of concentrated sulphuric acid at room temperature and the solutions is added gradually with rapid stirring to about 500 parts of hot water at 90° to 95° C. The precipitate is filtered off and the filter cake is washed neutral. It is made up to about 125 parts by weight by addition of water and the slurry is heated with stirring in an autoclave at 250° C. for 36 hours. After cooling the slurry is removed from the autoclave and stirred at 90°–95° C. for ½ hour with 7 parts of concentrated sulphuric acid to remove traces of iron. It is then filtered, washed free from acid and dried. A bright scarlet pigment composition is so obtained. When examined by X-rays a diffraction pattern is obtained with exhibits lines corresponding to the following interplanar spacings in Angstrom units.

Strong lines _____ 13.9, 6.6, 3.31
Medium lines _____ 6.95, 3.65, 3.46
Weak lines _____ 5.5, 4.6, 4.29, 3.41, 3.11

This is different from the sum of the diffraction patterns of 4:11-dichloro-linear-quinacridone and α-, β- or γ-crystal phase lin-quinacridone.

The product, which has a specific surface area of 20.2 square meters per gram, may be used as a pigment, and when incorporated into paints, lacquers or other surface coatings it gives bright scarlet shades of excellent fastness to heat, light and solvents and excellent fastness to outdoor exposure to the weather. It can also be used for the mass colouration of plastic materials and artificial fibres.

If in this example the autoclave heating is carried out for 12 hours instead of 36 hours a similar product is obtained, exhibiting the same lines in its X-ray diffraction pattern, but being less highly crystalline and of greater surface area (25.4 square metres per gram).

*Example 2*

37 parts of an aqueous paste containing 2.85 parts of lin-quinacridone and 2.15 parts of 2:9-dichloro-lin-quinacridone (obtained by pasting the mixture from sulphuric acid as described in Example 1) are mixed with 83 parts of water. The slurry is then heated and stirred in an autoclave at 250° C. for 24 hours. After cooling the slurry is heated with 7 parts of concentrated sulphuric acid and it is then filtered, washed and dried. A bright bluish red pigment is obtained. When examined by X-rays a diffraction pattern is obtained which exhibits lines corresponding to the following interplanar spacings in Angstrom units Strong lines _____ 6.45, 3.21
Medium lines _____ 5.9, 3.58
Weak lines _____ 7.45, 4.90, 3.94, 3.33, 3.13

This is different from the sum of the diffraction patterns of 2:9-dichloro-lin-quinacridone and α-, β- or γ-crystal phase lin-quinacridone.

If desired the process of this example may be carried out by heating at 220° for 36 hours or at 270° for 12 hours.

*Example 3*

A mixture of 5.0 parts of lin-quinacridone and 3.6 parts of 2:9-dimethyl-lin-quinacridone is dissolved in 165 parts of concentrated sulphric acid at room temperature and the solution is added gradually with rapid stirring to about 1000 parts of water at 80° to 90° C.

The precipitate is filtered off, and washed neutral. It is then made up to 250 parts by addition of water and the slurry is heated with stirring at 250° for 16 hours. The pigment is isolated and dried as described in Example 1. A bright bluish red pigment is obtained which on examination by means of X-rays exhibits a diffraction pattern in which no evidence is to be seen of the presence of crystals of 2:9-dimethyl-lin-quinacridone or of any of the polymorphic forms of lin-quinacridone.

*Example 4*

A mixture of 3.7 parts of 3:10-dichloro-lin-quinacridone and 1.3 parts of lin-quinacridone is dissolved in sulphuric acid, poured into water, and the precipitate filtered and washed free of acid. The neutral aqueous paste is made up to about 125 parts with water and heated with stirring in an autoclave at 250° for 15 hours. After cooling the bright red pigment is isolated as described in the previous examples. On examination by X-rays a diffraction pattern is obtained which shows no evidence of crystals of 3:10-dichloro-lin-quinacridone or of any of the polymorphic forms of lin-quinacridone.

*Example 5*

A laboratory ball mill comprising a cylindrical tinned iron can rotated by means of rubber rollers is charged with 800 parts of case hardened steel balls each approximately 1 centimetre in diameter, 80 parts of iron nails, 50 parts of dry sodium chloride, 2.85 parts of lin-quinacridone and 2.15 parts of 2:9-dichloro-lin-quinacridone. The mill is rotated at about 120 revolutions per minute for 48 hours. The contents of the mill are then discharged and the mixture of salt and quinacridones is separated from the balls and nails. The mixture is then added to water and stirred until all the salt has dissolved. It is then filtered and washed free from salt. The filter cake of pigment is then mixed with water to make a total of about 120 parts, and the slurry is heated in an autoclave at 250° for 12 hours. After cooling it is removed from the autoclave and heated at 90° to 95° for ½ hour with 7 parts of concentrated sulphuric acid to remove traces of iron. It is then filtered, washed neutral and dried. A bright bluish red pigment is obtained which is very similar to the pigment of Example 2.

*Example 6*

11 parts of a mixture of 2:5-bis(arylamino)terephthalic acids obtained from dimethyl succinylosuccinate, aniline and p-chloroaniline as described in Example 12 of British Patent No. 896,916 is cyclised by heating to 150° with tetraphosphoric acid as described in the first paragraph of that example, diluted and poured into excess of water and the precipitated solid is filtered off and washed free of acid. The paste of mixed quinacridones obtained in this way is made up to 250 parts by adding water, and is then heated in an autoclave with stirring at 250° for 16 hours. After cooling, the aqueous pigment suspension is removed from the autoclave and stirred at 90° to 95° C. for ½ hour with 14 parts of concentrated sulphuric acid to remove traces of iron. It is then filtered, washed free from acid and dried. A bright bluish red pigment is obtained, which has an X-ray diffraction pattern very similar to the pigment described in Example 2.

*Example 7*

10 parts of dimethyl succinylosuccinate is condensed with 8 parts of aniline and 33 parts of m-chloroaniline and the product is dehydrogenated and hydrolysed to a mixture of 2:5-diarylaminoterephthalic acids using the technique described in Example 12 of British Patent No. 896,916. 11.6 parts of the mixture so obtained are cyclised to quinacridones by heating with 58 parts of polyphosphoric acid and the solution is poured into water and the precipitate filtered off and washed free of acid. The filter cake is mixed with water to make 250 parts and heated at 250° for 12 hours in an autoclave. After cooling the pigment slurry is removed from the autoclave and heated with 14 parts of concentrated sulphuric acid at 90° to 95° for ½ hour to remove traces of iron. It is then filtered, washed neutral and dried.

A bright red pigment is so obtained, containing lin-quinacridone, 3:10 - dichloro - lin - quinacridone, and 3-chloro-lin-quinacridone. Examination by X-rays shows it to be highly crystalline, and the diffraction pattern is very similar to that of 3:10-dichloroquinacridone. There is no evidence of the presence of crystals of 3-chloro-lin-quinacridone on any of the polymorphic forms of lin-quinacridone.

In place of 8 parts of aniline and 33 parts of m-chloroaniline in Example 7, there may be used the quantities of the amines indicated in the following table. In each case the X-ray diffraction pattern of the crystalline pigment obtained is different from the sum of the X-ray diffraction patterns of the constituent quinacridones.

| Example | Amine I | Amine II | Shade of Pigment Composition |
|---|---|---|---|
| 8 | Aniline (8 parts) | o-Chloroaniline (33 parts) | Red. |
| 9 | ----do---- | m-Chloroaniline (52.5 parts). | Mid-shade red. |
| 10 | Aniline (16 parts) | p-Bromoaniline (29.4 parts) | Reddish violet. |
| 11 | ----do---- | o-Toluidine (18.4 parts) | Red. |
| 12 | Aniline (5.14 parts) | m-Toluidine (3.94 parts) | Red. |
| 13 | Aniline (16 parts) | p-Toluidine (18.4 parts) | Bluish red. |
| 14 | o-Toluidine (18.2 parts) | m-Toluidine (18.2 parts) | Mid-shade red. |
| 15 | o-Chloroaniline (22 parts) | p-Chloroaniline (22 parts) | Bluish red. |
| 16 | ----do---- | m-Chloroaniline (22 parts) | Red. |
| 17 | p-Chloroaniline (22 parts) | p-Toluidine (18.4 parts) | Reddish violet. |

I claim:
1. A process for the manufacture of a pigment composition consisting essentially of at least 2 different linear quinacridones of the formula

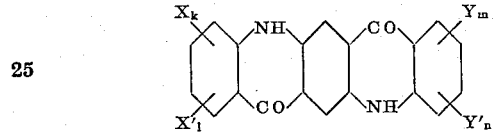

where $X$, $X'$, $Y$ and $Y'$ are radicals selected from the group consisting of Cl, Br, an alkyl group having 1–4 carbon atoms and an alkoxy group having 1–4 carbon atoms, and wher $k$, $l$, $m$ and $n$ are integers from 0–1, said composition being characterised in that the X-ray diffraction pattern is different from the sum of the X-ray diffraction patterns of its constituent quinacridones, and process comprising heating under pressure at between 150° and 300° C. a neutral aqueous paste of the constituent linear quinacridones.

2. Process according to claim 1 wherein the heating is carried out between 220° and 270° C.

References Cited by the Examiner

UNITED STATES PATENTS 3,160,510  12/1964  Ehrich _____ 106—288

FOREIGN PATENTS 603,575  8/1960  Canada.
896,916  5/1962  Great Britain.

TOBIAS E. LEVOW, *Primary Examiner.*

J. E. POER, S. E. MOTT, *Assistant Examiners.*